Nov. 1, 1938.  W. R. BILLINGSLEY  2,135,097
TRAILER
Filed Feb. 12, 1938    2 Sheets-Sheet 1
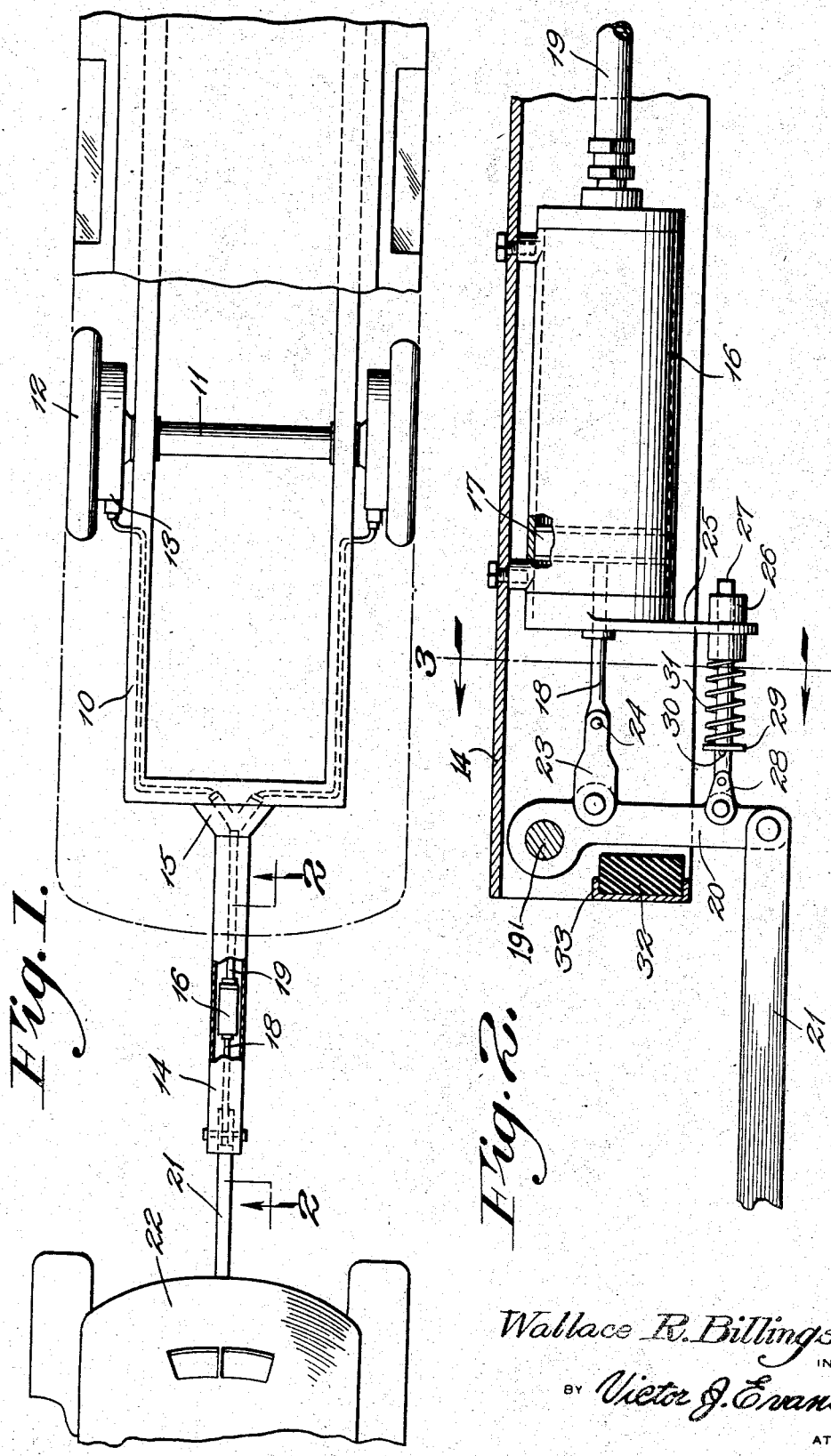
Wallace R. Billingsley
INVENTOR
BY Victor J. Evans & Co.
ATTORNEYS Nov. 1, 1938.  W. R. BILLINGSLEY  2,135,097
TRAILER
Filed Feb. 12, 1938    2 Sheets-Sheet 2

Wallace R. Billingsley
INVENTOR

BY Victor J. Evans & Co.
ATTORNEYS

Patented Nov. 1, 1938

2,135,097

UNITED STATES PATENT OFFICE 2,135,097

TRAILER

Wallace R. Billingsley, Daytona Beach, Fla.

Application February 12, 1938, Serial No. 190,339

3 Claims. (Cl. 188—112)

My invention relates to improvements in trailers and more particularly to automatic brake-applying mechanism adapted for control by the action of the tow car.

One of the principal objects of my invention is to provide a brake operating mechanism that can be easily and expeditiously applied to trailers having the two or four wheel brake system.

Another object of my invention is to provide a brake operating mechanism applied to trailers whereby the same is automatically operated, upon the accidental disconnection of the tow car.

A still further object of my invention is to provide a brake operating mechanism that is capable of operation independent of the tow car.

Other objects and advantages will be apparent from the following description, appended claims and annexed drawings.

Referring to the drawings wherein like reference characters designate like parts throughout the several views:

Fig. 1 is a top plan view of my invention illustrating its application to a trailer attached to a tow car.

Fig. 2 is a section view on line 2—2 of Fig. 1.

Figure 3:
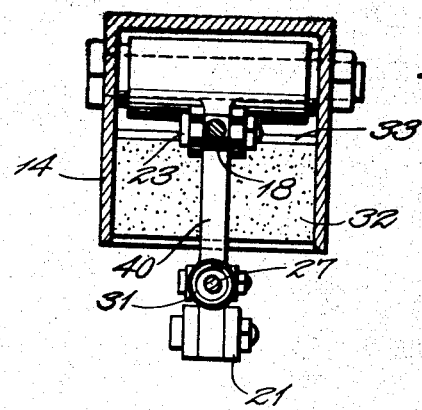
Fig. 3 is a section view on line 3—3 of Fig. 2.

In practicing my invention, particular reference being had to the preferred embodiment illustrated in Figures 1 to 3 inclusive of the drawings, there is illustrated a typical form of trailer chassis 10 having secured thereto an axle 11 on which is mounted wheels 12 provided with a typical form of hydraulic brake mechanism 13.

The front of the chassis has secured thereto a draft bar in the form of an inverted U-shaped channel iron 14 by means of a connecting member 15. Positioned within said draft bar or member is a cylinder 16 having a piston 17 operable therein by means of a connecting rod 18 secured thereto. The cylinder 16 is connected to the brake mechanism 13 by means of a hose connection 19. Actuation of the piston in one direction will force liquid through the connection 19 for applying the brakes to the wheels and reverse movement will release the brakes, said parts being of a well known construction and operation.

Pivoted on a shaft 19' within the draft member 14, at the front end thereof, is a depending arm 20 pivotally connected at the lower end thereof to a draw bar 21 secured to the tow car 22. Subjacent the pivot connecting said arm to said draft member, there is mounted a pivoted link 23 pivotally connected as at 24 to the outer end of the connecting rod 18. The front end of the cylinder 16 is provided with a depending flange 25 having fashioned thereon a bearing 26 for slidably receiving therethrough one end of a plunger rod 27. The opposite end of said plunger rod is pivotally connected to the arm 20 by means of a link 28. A collar 29 is mounted on said plunger rod 27 and movement in one direction relative to the rod is limited by a transversely extending pin 30. A coil spring 31 is mounted about said plunger rod and interposed between the collar 29 and bearing 26, the spring serving to urge the rod 18, through the connected parts, to release the brakes.

The lower forward end of the draft member is provided with a buffer 32 secured within the channel by means of a transversely extending bracket 33, said buffer serving to limit and cushion the outward movement of the arm 20.

Pull exerted on the draft bar 21 through the medium of the tow car 22 will cause the arm 20 to contact the buffer 32 causing the connecting rod 18 to position the piston 17 at the forward end of the cylinder 16 thereby effecting a release of the brake mechanism in relation to the wheels 12.

Deceleration of the speed of the tow car 22 will exert pressure on the arm 20 in an opposite direction causing the piston 17 to be moved towards the opposite end of the cylinder, through the medium of the connected mechanism, and actuate the braking mechanism in the well known manner.

The spring 31 functions together with the correlated parts to maintain the arm in normal operating position and prevent the application of the brakes—when the tow car and trailer are traveling over substantially level ground—due to inequalities in the road surface.

Figure 4:
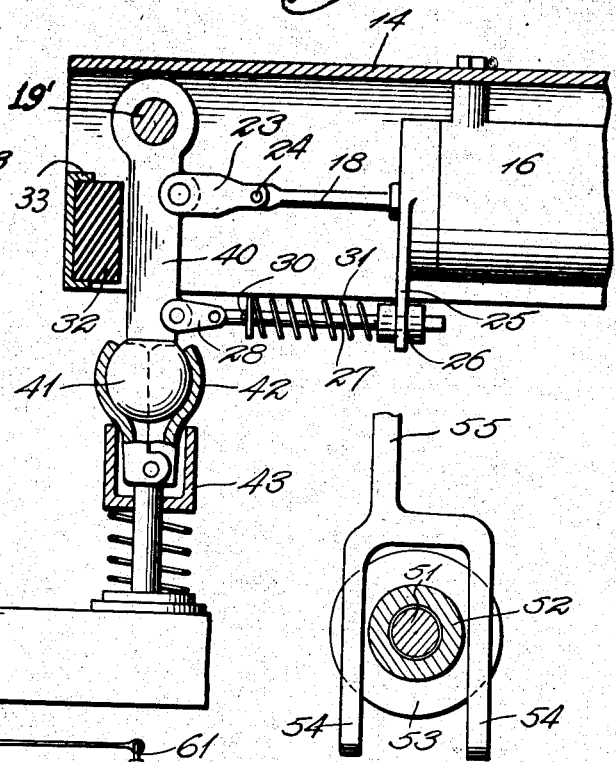
Fig. 4 is a fragmentary longitudinal sectional view of a modified form.

The form illustrated in Fig. 4 comprises the depending arm 40 provided with a ball shaped head 41 for engagement within a similar shaped hinged sectional sleeve 42. A spring pressed collar 43 is provided to normally surround the hinge portions of the sleeve to maintain the sections in locked position about the head. Downward movement of the collar from about the sleeve will permit the sections to be opened and the depending arm detached therefrom, thus providing an effective means for connecting and disconnecting the trailer from the tow car.

Figures 5, 6:
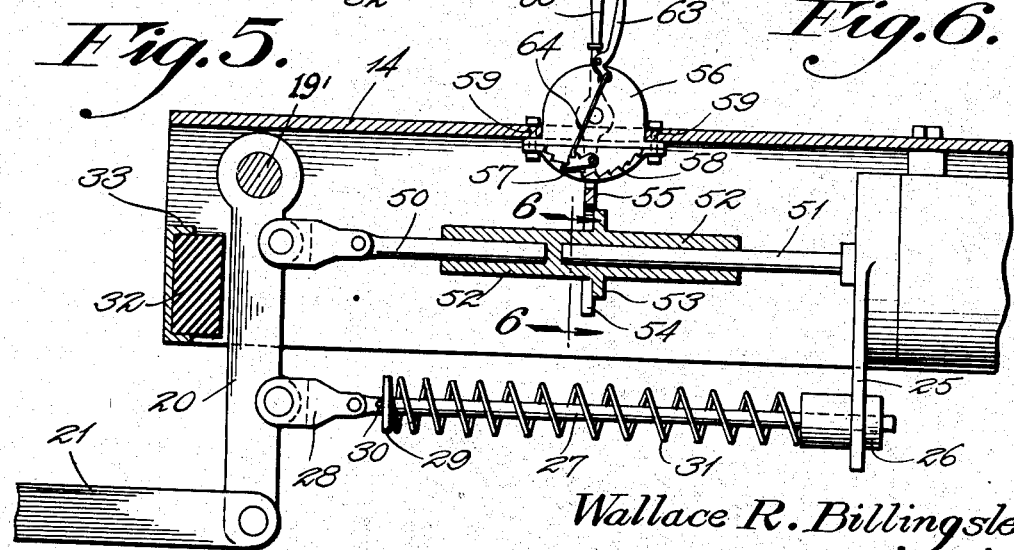
Fig. 5 is a longitudinal sectional view of another modification.
Fig. 6 is a sectional view on line 6—6 of Fig. 5.

In the forms illustrated in Figures 5 and 6 the connecting rod comprises sections 50 and 51 secured in spaced relation by an interior partitioned sleeve 52. The sleeve is formed with an exterior collar 53 for engagement with fingers 54 formed on the lower end of a lever 55. The lever 55 is pivoted to a support 56 and has mounted thereon a pawl 57 for engagement with teeth in a segmental rack bar 58 connected to support 56. The support 56 and rack bar 58 are connected to the draft member by means of suitable nuts and bolts 59. The upper end of the lever is provided with a handle 60 formed with an eye 61 for securing thereto a cable 62. A suitable handpiece 63 is mounted on the lever subjacent the handle 60 and connected to the pawl by means of a rod 64.

Operation of the connecting rods 50 and 51 through the medium of the depending arm will effect an operation of the piston within the cylinder in the same manner described in connection with the form illustrated in Figures 1 to 3 inclusive. However, pull exerted on the cable 62 will, through the medium of the collar 53, move the sleeve and section 51 towards the cylinder independent of the section 50. Operation of the device in this manner is desirable in instances where the tow car becomes accidentally disconnected from the trailer, the opposite end of the cable being connected to the tow car will upon the accidental disconnection of the tow car function to apply the brakes in the foregoing manner.

When the trailer has become disengaged from the tow car, for instance during a camping period or the like, the brakes may be applied by means of manual operation of the handle 60. Release of the brakes may be obtained by operation of the handpiece causing the disengagement of the pawl from the rack bar.

It is to be distinctly understood that various changes and modifications in construction and arrangement of parts may be resorted to without departing from the spirit of the invention or scope of the appended claims.

Having described my invention, what I claim is:

1. A trailer brake operating mechanism, comprising, in combination, a trailer chassis having wheels provided with braking mechanism, a draft member secured to the front end of said chassis having a brake operating device including a piston and a cylinder connected to said braking mechanism, a depending arm pivoted to said draft member and adaptable for connection with a tow car, a sectional connecting rod connecting said arm to said piston, means carried by said cylinder and connected to said arm for normally urging said piston in brake releasing position, and means secured to said draft member adjacent said depending arm for limiting the movement of said arm.

2. A trailer brake operating mechanism, comprising, in combination, a trailer chassis having wheels provided with braking mechanism, a draft member secured to the front end of said chassis having a brake operating device including a piston and a cylinder connected to said braking mechanism, a depending arm connected to said draft member and adapted for connection with a tow car, means connecting said arm to said piston whereby to move said piston in brake applying position upon pressure exerted on said arm by a tow car, and means connected to said arm and said cylinder whereby to position said piston in brake releasing position during the operation of a tow car at a constant speed.

3. A trailer brake operating mechanism, comprising, in combination, a trailer chassis having wheels provided with braking mechanism, a draft member secured to the front end of said chassis and having a brake operating device including a piston and a cylinder connected to said brake mechanism, a depending arm pivoted to said draft member and adapted for connection with a tow car, a sectional rod connected to said piston and pivoted to said arm, a connecting member securing said sections together in spaced relation, and means mounted on said draft member for operating said connecting member in a manner to position said piston in brake applying position independent of said depending arm.

WALLACE R. BILLINGSLEY.